(12) United States Patent
Cho

(10) Patent No.: US 11,799,680 B2
(45) Date of Patent: Oct. 24, 2023

(54) METHOD AND SYSTEM FOR PROVIDING ONLINE MEETING NOTES

(71) Applicant: LINE Plus Corporation, Seongnam-si (KR)

(72) Inventor: Hoyoung Cho, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 18/074,047

(22) Filed: Dec. 2, 2022

(65) Prior Publication Data

US 2023/0100710 A1    Mar. 30, 2023

Related U.S. Application Data

(63) Continuation of application No. 17/466,515, filed on Sep. 3, 2021, now Pat. No. 11,539,543.

(30) Foreign Application Priority Data

Sep. 4, 2020   (KR) .......................... 10-2020-0112772

(51) Int. Cl.
*H04L 12/18*       (2006.01)
*G06Q 10/1091*  (2023.01)
(Continued)

(52) U.S. Cl.
CPC ..... *H04L 12/1831* (2013.01); *G06Q 10/1091* (2013.01); *H04L 67/535* (2022.05); *H04L 67/75* (2022.05); *G06Q 50/01* (2013.01)

(58) Field of Classification Search
None
See application file for complete search history.

(56) References Cited

U.S. PATENT DOCUMENTS 11,095,468 B1 *   8/2021   Pandey ............... H04L 12/1831
2013/0110925 A1   5/2013   Wessling et al.
(Continued)

FOREIGN PATENT DOCUMENTS

KR     10-20080037262 A     4/2008
KR     10-2016-0106610 A     9/2016

OTHER PUBLICATIONS

"[Cafe Marketing] Start by Raising Naver Cafe Ratings Scoring Methods, and Knowing Cafe Marketing Properly", NaverBlog, Jun. 20, 2011, https://blog.naver.com/shiaru/50113921024 (5 pages total).

(Continued)

*Primary Examiner* — Jeffrey R Swearingen
(74) *Attorney, Agent, or Firm* — Sughrue Mion, PLLC

(57) ABSTRACT

A method is provided. The method includes based on an online meeting ending, receiving, by a user terminal, a link for creating a meeting note for the online meeting from an external device; based on a first user input of selecting the link for creating the meeting note, displaying a user interface for creating the meeting note on a display of the user terminal; receiving at least one second user input within the user interface for creating the meeting note; and transmitting information associated with the at least one second user input to the external device to control the external device to share the meeting note created based on the at least one second user input with at least one participant of the online meeting.

20 Claims, 12 Drawing Sheets

(51) Int. Cl.
*H04L 67/75* (2022.01)
*H04L 67/50* (2022.01)
*G06Q 50/00* (2012.01)

(56) References Cited

U.S. PATENT DOCUMENTS

| | | |
|---|---|---|
| 2015/0200786 A1 | 7/2015 | Stott et al. |
| 2016/0306504 A1 | 10/2016 | Brunsch et al. |
| 2019/0349212 A1 | 11/2019 | Heins et al. |
| 2020/0374146 A1* | 11/2020 | Chhabra ............. H04L 12/1822 |
| 2020/0403817 A1* | 12/2020 | Daredia ................ G06F 16/345 |
| 2020/0412561 A1* | 12/2020 | DeLuca ............. H04L 12/1831 |
| 2021/0058263 A1* | 2/2021 | Fahrendorff .......... H04L 67/306 |
| 2021/0092168 A1* | 3/2021 | Ranalli ................. H04M 3/567 |
| 2021/0375289 A1* | 12/2021 | Zhu ................ G06Q 10/063118 |
| 2021/0390144 A1 | 12/2021 | B M S et al. |

OTHER PUBLICATIONS

"Rating System Cafe and Rights, Benefit Guide", NaverBlog, Nov. 16, 2019, https://blog.naver.com/perseus1025/221709296408 (4 pages total).

* cited by examiner

FIG. 8

PARTICIPANT INFO. /730

| NICKNAME /810 | ID /820 | E-MAIL /830 | PARTICIPATION PERIOD /840 | ACTIVITY SCORE /850 | SHARE /860 |
|---|---|---|---|---|---|
| Brown | BR123 | BR@line.com | 34Min. | 13 | ☐ |
| James | James.meeting | JA@line.com | 51Min. | 52 | ■ |
| Jessica | JSSI | JE@line.com | 30Min. | 34 | ☐ |
| Sally | Sally1 | SA@line.com | 42Min. | 72 | ■ |
| ... | ... | ... | ... | ... | ... |

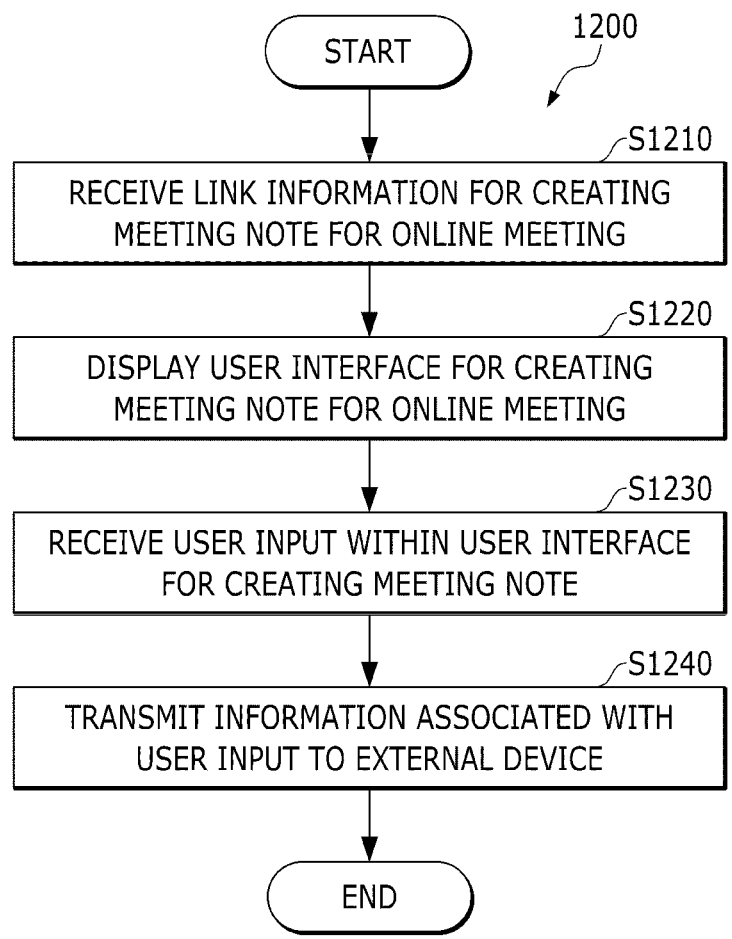

METHOD AND SYSTEM FOR PROVIDING ONLINE MEETING NOTES

CROSS-REFERENCE TO RELATED APPLICATION

This application is a continuation application of U.S. application Ser. No. 17/466,515, filed on Sep. 3, 2021, which claims priority to Korean Patent Application No. 10-2020-0112772, filed in the Korean Intellectual Property Office on Sep. 4, 2020, the entire contents of which are hereby incorporated by reference.

BACKGROUND

Field

Apparatuses, methods and systems consistent with example embodiments relate to sharing online meeting notes, and more particularly, to easily providing meeting notes to participants after an online meeting.

Description of Related Art

As the culture of remote work and telecommuting has spread in accordance with the recent rise of untacting (non-contacting) society, the use of online meeting services is rapidly increasing. For example, platforms provide online meeting services, and may provide a video call function, a screen sharing function, and a chat function by using camera sensors and microphone sensors. With these online meeting services, users are able to talk and share information without actually meeting other people.

The online meeting starts as the participants connect online, and ends when the host of the online meeting ends the meeting or all meeting participants leave. That is, the online meeting service provides various services only while the online meeting is in progress, and does not provide any services once the online meeting ends. Accordingly, once the online meeting ends, and when it is necessary to deliver information, materials, and the like to the meeting participants, there is a problem that the user has to identify who participated in the online meeting and directly transmit e-mails, messages, and the like to the individual participants.

SUMMARY

In order to solve the problems described above, example embodiments provide a method, a non-transitory computer-readable recording medium storing instructions, and an apparatus (system) for sharing meeting notes.

Example embodiments may be implemented in a variety of ways, including a method, an apparatus (system), or a non-transitory computer-readable storage medium storing instructions.

According to an example embodiment, a method includes: based on an online meeting ending, receiving, by a user terminal, a link for creating a meeting note for the online meeting from an external device; based on a first user input of selecting the link for creating the meeting note, displaying a user interface for creating the meeting note on a display of the user terminal; receiving at least one second user input within the user interface for creating the meeting note; and transmitting information associated with the at least one second user input to the external device to control the external device to share the meeting note created based on the at least one second user input with at least one participant of the online meeting.

The method may further include: based on a third user input for creating the online meeting, transmitting a request to create the online meeting to the external device; and receiving, from the external device, the link for participating in the online meeting.

The request to create the online meeting may indicate information about a meeting type, and the method may further include generating the user interface for creating the meeting note based on the meeting type of the online meeting.

The user interface for creating the meeting note may include an area in which any one or any combination of a title of the online meeting or an identifier of the online meeting is displayed.

The user interface for creating the meeting note may include an area in which information about participants of the online meeting is displayed.

The information about the participants of the online meeting may indicate any one or any combination of a nickname, an identifier, or an e-mail address.

The information about the participants of the online meeting indicates any one or any combination of a participation period, an entry time, an exit time, or an activity score for each of the participants.

The method may further include identifying the activity score for each of the participants based on any one or any combination of a text chat frequency or a voice speech frequency.

The user interface for creating the meeting note may include an area for selecting at least one of the participants of the online meeting to share the meeting note with.

The user interface for creating the meeting note may include an area for inputting any one or any combination of information about a subsequent online meeting or a subsequent online meeting link for participating in the subsequent online meeting.

The user interface for creating the meeting note may include an area for inputting information about a service associated with another external device different from the external device.

The user terminal may be associated with a participant of the online meeting that is designated by a user who created the online meeting.

The method may further include sharing the meeting note with at least one participant of the online meeting that has a participation period or activity score equal to or greater than a predetermined threshold.

According an example embodiment, a non-transitory computer-readable recording medium stores instructions for executing a method that includes: based on an online meeting ending, receiving, by a user terminal, a link for creating a meeting note for the online meeting from an external device; based on a first user input of selecting the link for creating the meeting note, displaying a user interface for creating the meeting note on a display of the user terminal; receiving at least one second user input within the user interface for creating the meeting note; and transmitting information associated with the at least one second user input to the external device to control the external device to share the meeting note created based on the at least one second user input with at least one participant of the online meeting.

According to an example embodiment, an information processing system includes: a communication interface; a memory; and at least one processor configured to execute at least one computer-readable program stored in the memory, wherein the at least one computer-readable program includes instructions for controlling the information processing system to: based on an online meeting ending, transmit a link for creating a meeting note for the online meeting to a first user terminal; receive a request to share the meeting note from the first user terminal, wherein the request to share the meeting note includes information about the meeting note; and transmit the meeting note to a plurality of second user terminals associated with participants of the online meeting based on the request to share the meeting note.

The first user terminal may be associated with a user that created the online meeting, or with a participant of the online meeting designated by the user that created the online meeting.

A web document associated with the link for creating the meeting note for the online meeting may include information about the participants of the online meeting, and the information about the participants of the online meeting may indicate any one or any combination of a participation period, an entry time, an exit time, or an activity score for each of the participants.

The at least one computer-readable program may include instructions for controlling the information processing system to calculate the activity score for each of the participants based on any one or any combination of a text chat frequency or a voice speech frequency.

The request to share the meeting note may include information about at least one participant of the participants to share the meeting note with, and each of the at least one participant of the participants to share the meeting note with may be respectively associated with one of the plurality of second user terminals.

The plurality of second user terminals may be respectively associated with the participants of the online meeting having a participation period or activity score equal to or greater than a predetermined threshold.

BRIEF DESCRIPTION OF THE DRAWINGS

The above and/or other aspects will be more apparent by describing certain example embodiments, with reference to the accompanying drawings, in which:

FIG. 8 is a diagram illustrating an example of a participant information display area according to an example embodiment;

FIG. 12 is a flowchart illustrating a method for sharing a meeting note according to an example embodiment.

DETAILED DESCRIPTION

Figure 1:
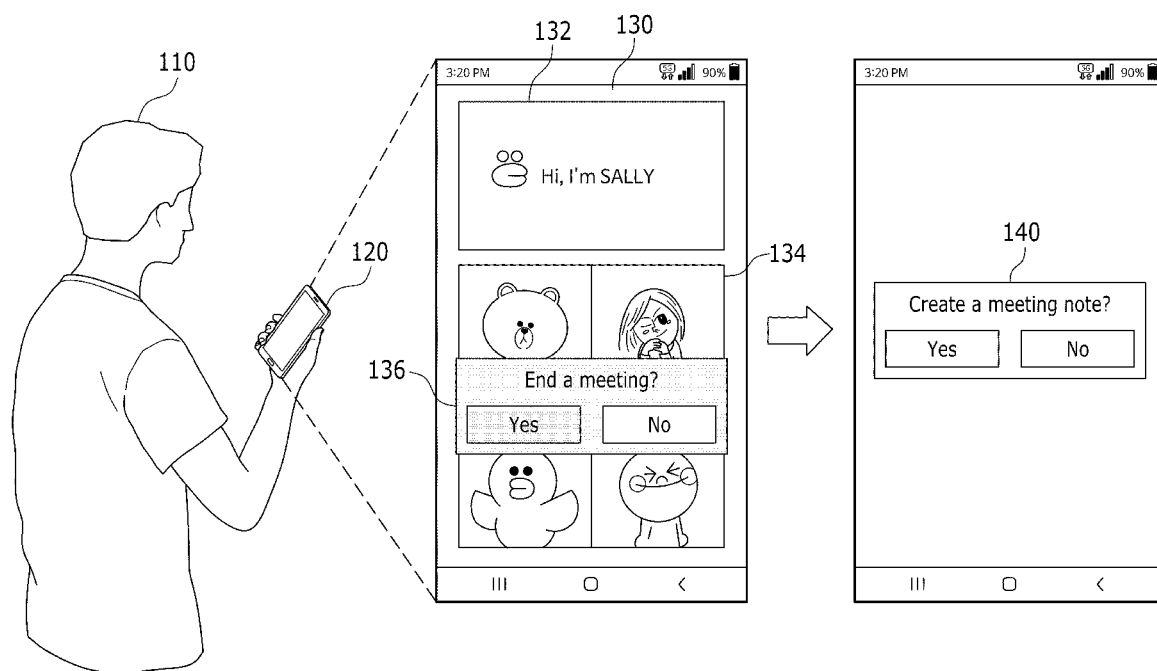
FIG. 1 is a diagram illustrating an example of creating a meeting note after an online meeting ends according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, duplicate descriptions of the same or corresponding components may be omitted. However, even if descriptions of components are omitted, it is not intended that such components are not included in any example embodiment.

Advantages and features will be apparent by referring to example embodiments described below in connection with the accompanying drawings. However, the present disclosure is not limited to the example embodiments disclosed below, and may be implemented in various different forms, and the presented example embodiments are merely provided to make the present disclosure complete, and to fully disclose the scope of the invention to those skilled in the art to which the present disclosure pertains.

The terms used herein will be briefly described prior to describing the disclosed example embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of example embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include) another component, rather than excluding the same, unless specified to the contrary. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, the term "online meeting" may refer to a meeting conducted online in which users can communicate, i.e., exchange opinions or conduct conversations, in real time. The types of online meeting may include a type where participants are predetermined, a type where participants are not determined, and the like.

The phrase "meeting note" may indicate an electronic document for providing participants with information associated with the online meeting after the online meeting.

FIG. 1 is a diagram illustrating an example of creating meeting notes after an online meeting ends according to an example embodiment. As illustrated, a user 110 may use a user terminal 120 to participate in an online meeting service. The online meeting service may refer to a service that enables communication with multiple people in real time online. For example, the online meeting may be a business meeting, a social gathering, a seminar, an event (e.g., first birthday party, wedding, and the like) streaming and the like, which are performed online.

When the user 110 creates an online meeting and starts the meeting, an online meeting interface 130 may be displayed on a display of the user terminal 120. The online meeting interface 130 may include an area 132 in which meeting materials (e.g., presentation materials, guides, and the like) are displayed, and an area 134 in which images of participants are displayed, but is not limited thereto. For example, the online meeting interface 130 may further include a chat window in which participants can exchange chats, an area indicating information about the participants (e.g., nickname, ID, e-mail address, and the like), and the like. In this case, the user 110 may select the type of area to be displayed on the online meeting interface 130, the size of each area, and the like. The user 110 may end the ongoing online meeting by using a meeting end menu 136 displayed on the online meeting interface 130.

The online meeting may allow participation using a participation link without logging-in. In this regard, after the online meeting ends, the user 110 may not know who the participants of the online meeting were. Additionally, even if the user knows who the participants of the online meeting were, the user may not have the contact information of the participants such as e-mail addresses or the like. Accordingly, it may not be easy for the user 110 to write a meeting note and share it with the participants after the online meeting ends. In one example embodiment, a server that provides the online meeting service may prompt the user 110 to create a meeting note after the online meeting ends, and share the meeting note created by the user 110 with the participants.

In an example embodiment, after the online meeting ends, the user 110 may receive a meeting note creation message 140 in the form of a push notification. In response to the user 110 selecting a "Yes" button in the meeting note creation message 140, a user interface for creating a meeting note may be displayed on the display of the user terminal 120. Alternatively, after the online meeting ends, the user 110 may be provided with link information (e.g., a URL) connected to the user interface for creating a meeting note. For example, the user 110 may receive the link information in the form of a push notification of an application that provides an online meeting service, or may receive an SMS message, an e-mail, and the like including the link information. The user 110 may select link information included in the push notification or the like by touch input or the like, and then write a meeting note using the user interface for creating a meeting note displayed on the display of the user terminal 120.

In an example embodiment, the user 110 may create a meeting note by inputting various information such as a summary of meeting details, a to-do list, information about subsequent online meetings, information for payment or remittance, survey items, and the like to the user interface for creating a meeting note. The user interface for creating a meeting note may have divided areas or provide various forms of input areas as a template to allow the user 110 to input various information with ease. In an example embodiment, the user interface for creating a meeting note may be determined based on the meeting type of the online meeting (e.g., business meeting, social gathering, seminar, streaming event, and the like), whether or not presentation materials are used, or the like.

The server that provides the online meeting service may share the meeting note written by the user 110 with the participants of the online meeting. For example, the server that provides an online meeting service may provide link information for accessing the meeting note to the participants of the online meeting through SMS message, e-mail, push notification, and the like. With this configuration, even when the user 110 does not know who the participants of the online meeting were or when it is difficult to obtain the contact information of the participants, it is possible to easily share the meeting notes with the participants.

Figure 2:
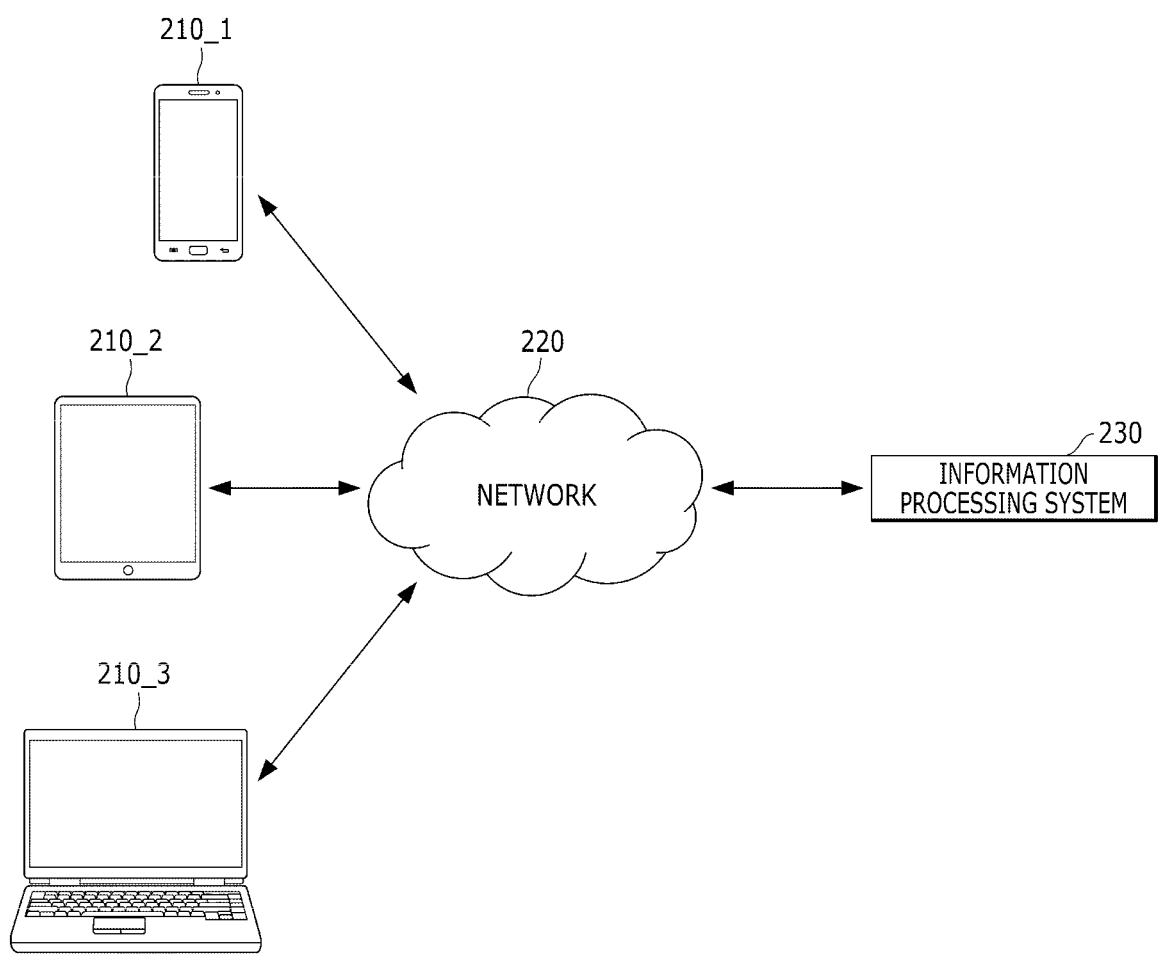
FIG. 2 is a schematic diagram illustrating a configuration in which an information processing system is communicatively connected to a plurality of user terminals in order to share a meeting note according to an example embodiment.

FIG. 2 is a schematic diagram illustrating a configuration in which an information processing system 230 is communicatively connected to a plurality of user terminals 210_1, 210_2, and 210_3 to share a meeting note according to an example embodiment. The information processing system 230 may include a system capable of providing an online meeting service, a meeting note sharing service, and the like through a network 220. According to an example embodiment, the information processing system 230 may include one or more server devices and/or databases, or one or more distributed computing devices and/or distributed databases based on cloud computing services, which can store, provide and execute computer-executable programs (e.g., downloadable applications) and data relating to the provision of online meeting service, meeting note sharing service after online meeting, and the like. The online meeting service, the meeting note sharing service, and the like provided by the information processing system 230 may be provided to the user through an online meeting application installed in each of the plurality of user terminals 210_1, 210_2, and 210_3. For example, the online meeting service may include an audio call service, a video call service, a screen sharing service, a text chat service, and the like using the online meeting application.

The plurality of user terminals 210_1, 210_2, and 210_3 may communicate with the information processing system 230 through the network 220. For example, the plurality of user terminals 210_1, 210_2, and 210_3 may include a terminal of a host who created the online meeting, a terminal of an online meeting participant, and the like. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 220 as well as short-range wireless communication between user terminals 210_1, 210_2 and 210_3.

In FIG. 2, a mobile phone terminal 210_1, a tablet terminal 210_2, and a PC terminal 210_3 are illustrated as the examples of the user terminals, but are not limited thereto, and the user terminals 210_1, 210_2 and 210_3 may be any computing device that is capable of wired and/or wireless communication and that can be installed with and execute an online meeting application, a web browsing application, and the like. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but example embodiments are not limited thereto, and a different number of user terminals may be configured to be in communication with the information processing system 230 through the network 220.

In an example embodiment, when the online meeting ends, the user terminals 210_1, 210_2, and 210_3 may each receive a link for creating a meeting note for the online meeting from the information processing system 230. When the user of the user terminal 210_1, 210_2, and 210_3 selects the received link for creating a meeting note, the user terminals 210_1, 210_2, and 210_3 may display a user interface for creating a meeting note on the display. Then, the user terminals 210_1, 210_2, and 210_3 may receive information for creating a meeting note from the user through the user interface for creating a meeting note and create a meeting note. The user terminals 210_1, 210_2, and 210_3 may transmit the created meeting note to the information processing system 230 for sharing with the participants of the online meeting.

Figure 3:
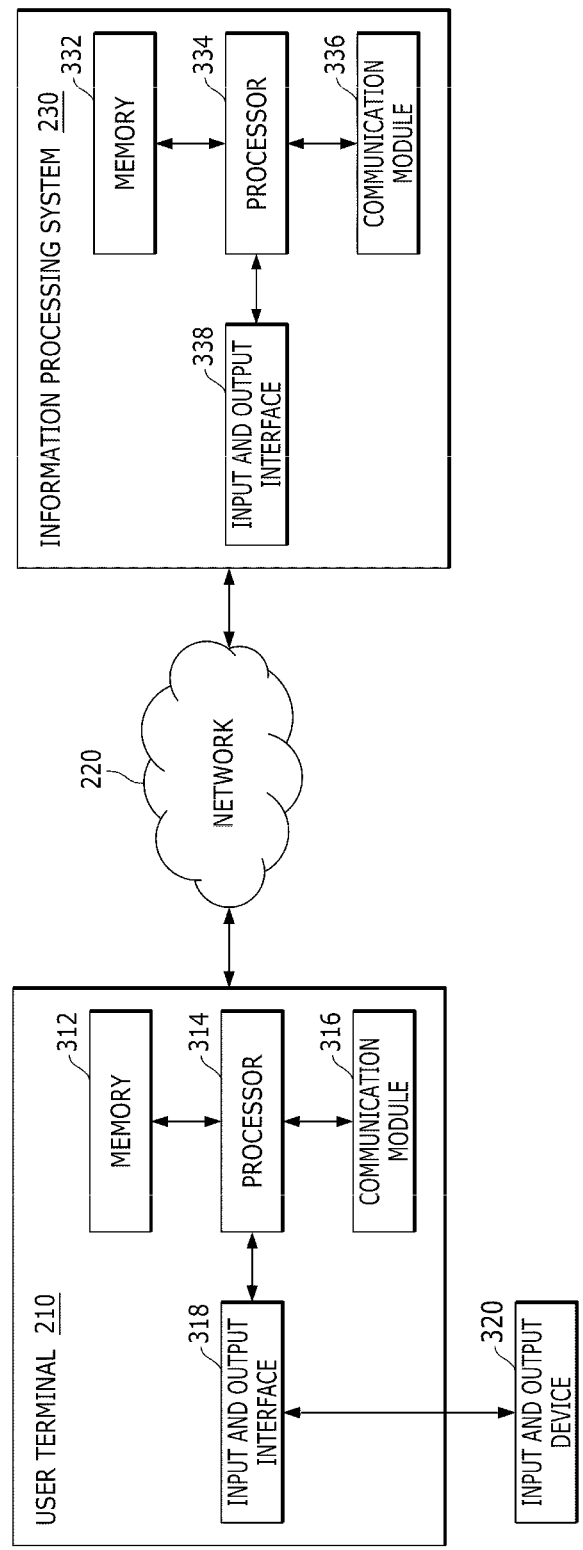
FIG. 3 is a block diagram illustrating an internal configuration of the user terminal and the information processing system according to an example embodiment.

FIG. 3 is a block diagram illustrating an internal configuration of the user terminal 210 and the information processing system 230 according to an example embodiment. The user terminal 210 may refer to any computing device that is capable of executing the online meeting application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data created from the user terminal 210 through the input and output interface 318.

The memories 312 and 332 may include any non-transitory computer-readable recording medium. According to an example embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and one or more program codes (e.g., a code for the online meeting application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, one or more programs may be loaded into the memories 312 and 332 based on a computer program (for example, an application that provides an online meeting service, a meeting note sharing service, and the like) installed by files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., request to create an online meeting, request to start an online meeting, request to participate in an online meeting, request to end an online meeting, information about a meeting note, request to share a meeting note, and the like) created by the processor 314 of the user terminal 210 according to a program code stored in a recording device such as the memory 312 or the like, may be transmitted to the information processing system 230 through the network 220 under the control of the communication module 316. Conversely, a control signal or instructions provided under the control of the processor 334 of the information processing system 230 may be received by the user terminal 210 via the communication module 336 and the network 220 and through the communication module 316 of the user terminal 210. For example, the user terminal 210 may receive link information for creating a meeting note for the online meeting, information about participants of the online meeting, and the like, from the information processing system 230 through the communication module 316.

The input and output interface 318 may be a means for interfacing with the input and output device 320. As an example, the input and output device 320 may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 318 may be a means for interfacing with a device, such as, for example, a touch screen or the like that integrates a configuration or function for performing inputting and outputting. For example, the processor 314 of the user terminal 210 may process the instructions of the computer program loaded in the memory 312, in which a service screen configured with the information and/or data provided by the information processing system 230 or other user terminals, the user interface for creating a meeting note, and the like, may be displayed on the display through the input and output interface 318. While FIG. 3 illustrates that the input and output device 320 is not included in the user terminal 210, example embodiments are not limited thereto, and the input and output device 320 may be configured as one device with the user terminal 210. In addition, the input and output interface 338 of the information processing system 230 may be a means for interfacing with a device for inputting or outputting, which may be connected to the information processing system 230 or included in the information processing system 230. In FIG. 3, while the input and output interfaces 318 and 338 are illustrated as the components configured separately from the processors 314 and 334, example embodiments are not limited thereto, and the input and output interfaces 318 and 338 may be configured to be included in the processors 314 and 334.

The user terminal 210 and the information processing system 230 may include more components than the components illustrated in FIG. 3. According to an example embodiment, the user terminal 210 may be implemented to include at least a part of the input and output device 320 described above. In addition, the user terminal 210 may further include other components such as a transceiver, a global positioning system (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 210.

According to an example embodiment, the processor 314 of the user terminal 210 may be configured to operate an online meeting application that provides an online meeting service, a meeting note sharing service, and the like. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. In addition, such information and/or data may be provided to the information processing system 230 through the communication module 316.

While the online meeting application is running, the processor 314 may receive text, image, video, and the like input or selected through the input and output device 320 such as a camera, a microphone, and the like that includes a touch screen, a keyboard, an audio sensor and/or an image sensor connected to the input and output interface 318, and store the received text, image, and/or video or the like in the memory 312, or provide it to the information processing system 230 through the communication module 316 and the network 220. In an example embodiment, the processor 314 may receive information for creating a meeting note through the input and output device 320, create a meeting note, and provide the created meeting note to the information processing system 230 through the network 220 and the communication module 316.

The processor 334 of the information processing system 230 may be configured to manage, process, and/or store the information and/or data received from a plurality of user terminals and/or a plurality of external systems. In an example embodiment, the processor 334 may receive, from the user terminal 210, information about a meeting note, information about meeting participants to share the meeting note with, a request to share a meeting note, and the like, and share the meeting note with the meeting participants. Additionally or alternatively, the processor 334 of the information processing system 230 may receive nicknames, IDs, e-mail addresses, and the like of the meeting participants, and calculate a participation period, entry time, exit time, activity score, and the like for each of the participants.

Figure 4:
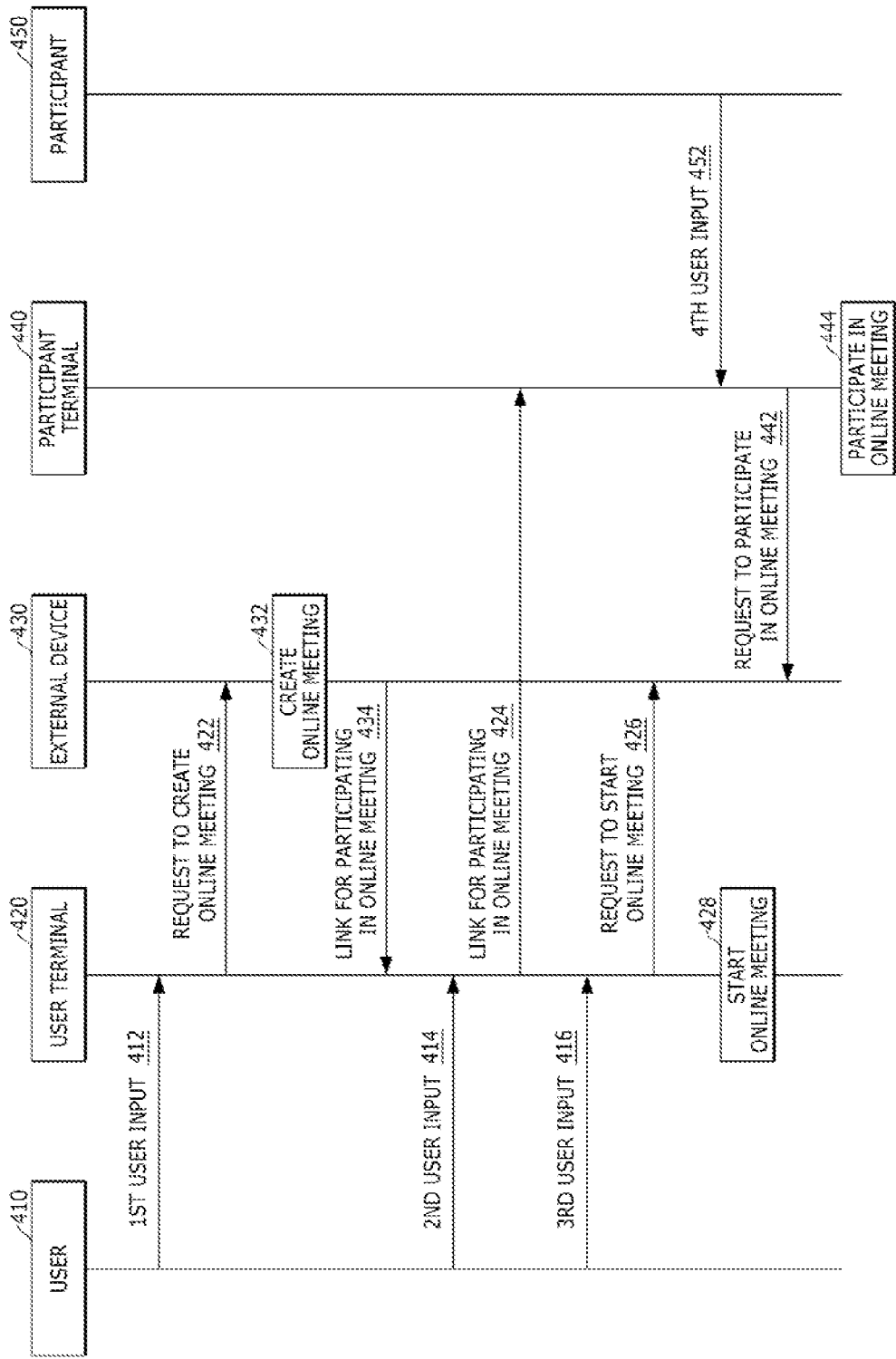
FIG. 4 is a flowchart illustrating a method for creating and starting an online meeting between a user, a user terminal, an external device, a participant terminal, and a participant according to an example embodiment.

FIG. 4 is a flowchart illustrating a method for creating and starting an online meeting between a user 410, a user terminal 420, an external device 430, a participant terminal 440, and a participant 450 according to an example embodiment. In an example embodiment, the user 410 may be a host who creates and starts an online meeting and the user terminal 420 may be a user terminal of the host. In addition, the participant 450 may be a participant who participates in the online meeting created and started by the user 410, and the participant terminal 440 may be a user terminal of the participant. In addition, the external device 430 is an external system that creates and manages an online meeting according to a request from the user terminal 420, and may refer to the information processing system (online meeting service providing server) of FIG. 2 that provides the online meeting service, for example.

As illustrated, the user terminal 420 may receive from the user 410 a first user input 412 for creating an online meeting. The first user input 412 may indicate information necessary for creating an online meeting. For example, the first user input 412 may indicate a start date and time of online meeting, type of online meeting (business meeting, social gathering, seminar, streaming event, and the like), title of online meeting, and the like.

Upon receiving the first user input 412, the user terminal 420 may transmit a request 422 to create an online meeting to the external device 430. Upon receiving the request 422 to create the online meeting, the external device 430 may create an online meeting at 432, and transmit an online meeting participation link 434 for participating in the created online meeting to the user terminal 420. The online meeting participation link 434 may include link information (e.g., a URL) for connecting to a web page, a platform, and the like that is capable of using an online meeting service such as an audio call service, a video call service, a text chat service, and the like. In an example embodiment, the online meeting participation link 434 may be transmitted to the user terminal 420 in the form of an SMS message that includes the link information, a push notification of an application, an e-mail, and the like.

Then, the user terminal 420 may receive from the user 410 a second user input 414 indicating a command to share the online meeting participation link with the participant 450. Upon receiving the second user input 414, the user terminal 420 may transmit an online meeting participation link 424 to the participant terminal 440. The online meeting participation link 424 may include link information for connecting to a web page or platform that can use the online meeting service, and information about the start date and time of online meeting, the host of online meeting, the type of online meeting, the title of online meeting, and the like. In an example embodiment, the online meeting participation link 424 may be transmitted to the participant terminal 440 in the form of an SMS message that includes the link information, a push notification of an application, an e-mail, and the like. The online meeting participation link 424 provided to the participant terminal 440 may be provided to the participant 450 through a display screen of the participant terminal 440.

In an example embodiment, the user terminal 420 may receive from the user 410 a third user input 416 indicating a command to start an online meeting. For example, the user 410 may input the third user input 416 to the user terminal 420 indicating the start date and time of online meeting. Upon receiving the third user input 416, the user terminal 420 may transmit a request 426 to the external device 430 to start an online meeting at 428. The external device 430 may receive the request 426 to start an online meeting and internally perform a process for starting an online meeting.

The participant terminal 440 may receive from the participant 450 a fourth user input 452 indicating a command to participate in the online meeting. Upon receiving the fourth user input 452, the participant terminal 440 may transmit a request 442 to participate in an online meeting to the external device 430 and participate in the online meeting at 444. The request 442 to participate in an online meeting may include information for identifying the online meeting, and information about a participant (ID, e-mail address, contact information, nickname, and the like). The external device 430 may receive the request 442 to participate in an online meeting and internally perform a process for allowing the participant to participate in the online meeting.

In an example embodiment, the external device 430 may store the time when the participant 450 participated and left the online meeting, as information about the participant 450. When the online meeting is started and the participant 450 attends the online meeting, an online meeting service including a text chat service, an audio call service, a video call service, and the like may be provided to the user 410 and the participant 450. While FIG. 4 illustrates that the online meeting participation link 424 is provided to the participant terminal of one participant 450 in response to the request of the user 410, and that the one participant 450 participates in the online meeting, example embodiments are not limited thereto. An online meeting participation link may be provided to terminals of two or more participants in response to the request of the user 410. Additionally or alternatively, instead of specifying the participants of the online meeting, a participation link to the online meeting may be provided to an unspecified number of other users. For example, the participation link to the online meeting may be uploaded to an online bulletin board in response to a request of the user 410.

Figure 5:
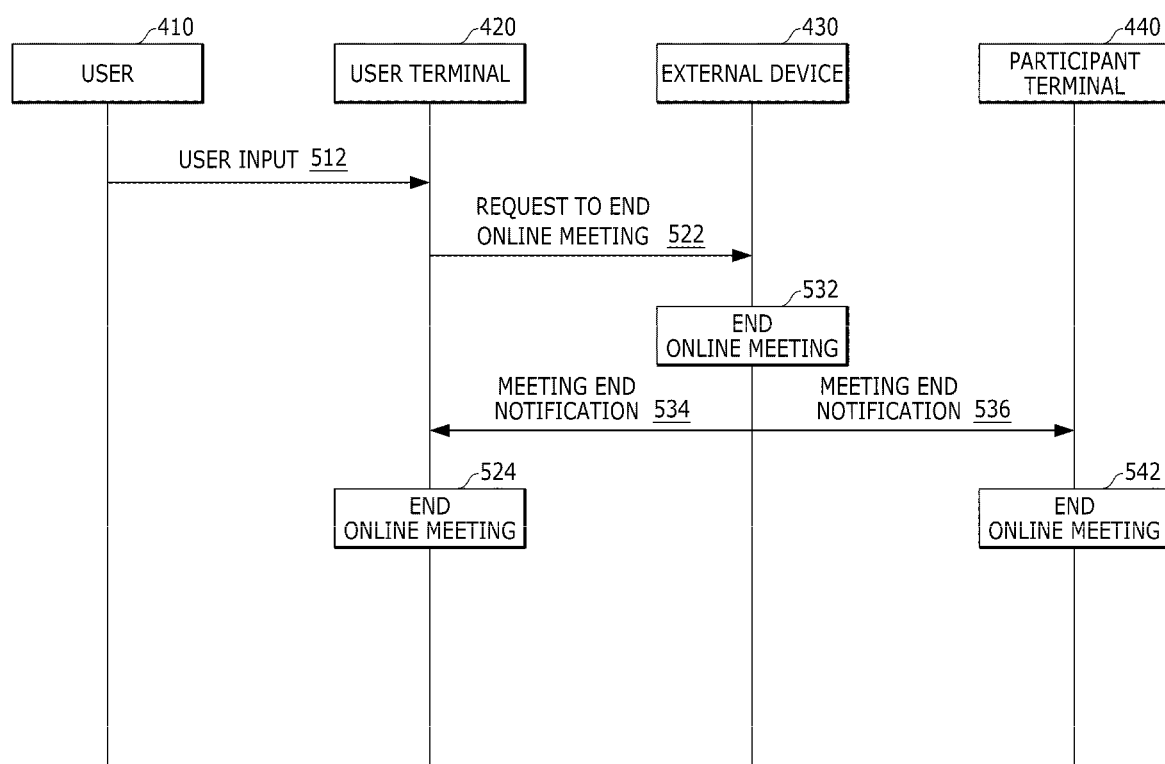
FIG. 5 is a flowchart illustrating a method for ending an online meeting between a user, a user terminal, an external device, and a participant terminal according to an example embodiment.

FIG. 5 is a flowchart illustrating a method for ending an online meeting between the user 410, the user terminal 420, the external device 430, and the participant terminal 440 according to an example embodiment. In an example embodiment, the user 410 may be a host who created the online meeting and the user terminal 420 may be a user terminal of the host. In another example embodiment, the user 410 and the user terminal 420 may be the user and the user terminal that received a host authorization from the host who created the online meeting. In addition, the participant terminal 440 may be a user terminal of the participant participating in the online meeting. In addition, the external device 430 is an external system that creates and manages an online meeting in response to receiving a request from the user terminal 420, and may refer to the information processing system of FIG. 2 that provides an online meeting service, for example. As illustrated, the user terminal 420 may receive from the user 410 a user input 512 for ending the online meeting. The user input 512 may indicate selection of an online meeting end button through a touch input or the like, or an operation of the user 410 leaving a web page, a platform, and the like that provides an online meeting service. Upon receiving the user input 512, the user terminal 420 may transmit a request 522 to end an online meeting to the external device 430.

When receiving the request 522 to end an online meeting, the external device 430 may end the online meeting at 532. Then, the external device 430 may transmit meeting end notifications 534 and 536 according to the end of the online meeting to the user terminal 420 and the participant terminal 440, respectively. The user terminal 420 and the participant terminal 440 receiving the meeting end notifications 534 and 536 may perform a subsequent process for ending the online meeting at 524 and 542. When the online meeting ends, the online meeting services including the audio call service, the video call service, the text chat service, and the like end, and a guide message, a sound effect, and the like indicating the end of the online meeting may be output to the user terminal 420 and the participant terminal 440.

While FIG. 5 illustrates that the external device 430 transmits the meeting end notifications 534 and 536 to one user terminal 420 and one participant terminal 440 when the online meeting ends, example embodiments are not limited thereto. In an example embodiment, the external device 430 may transmit the meeting end notifications to the user terminal 420 and all participants who attended the online meeting. Alternatively, the external device 430 may transmit the meeting end notifications to the participants who attended the meeting until the end of the online meeting (i.e., those participants using a terminal that received a meeting end notification).

Figure 6:
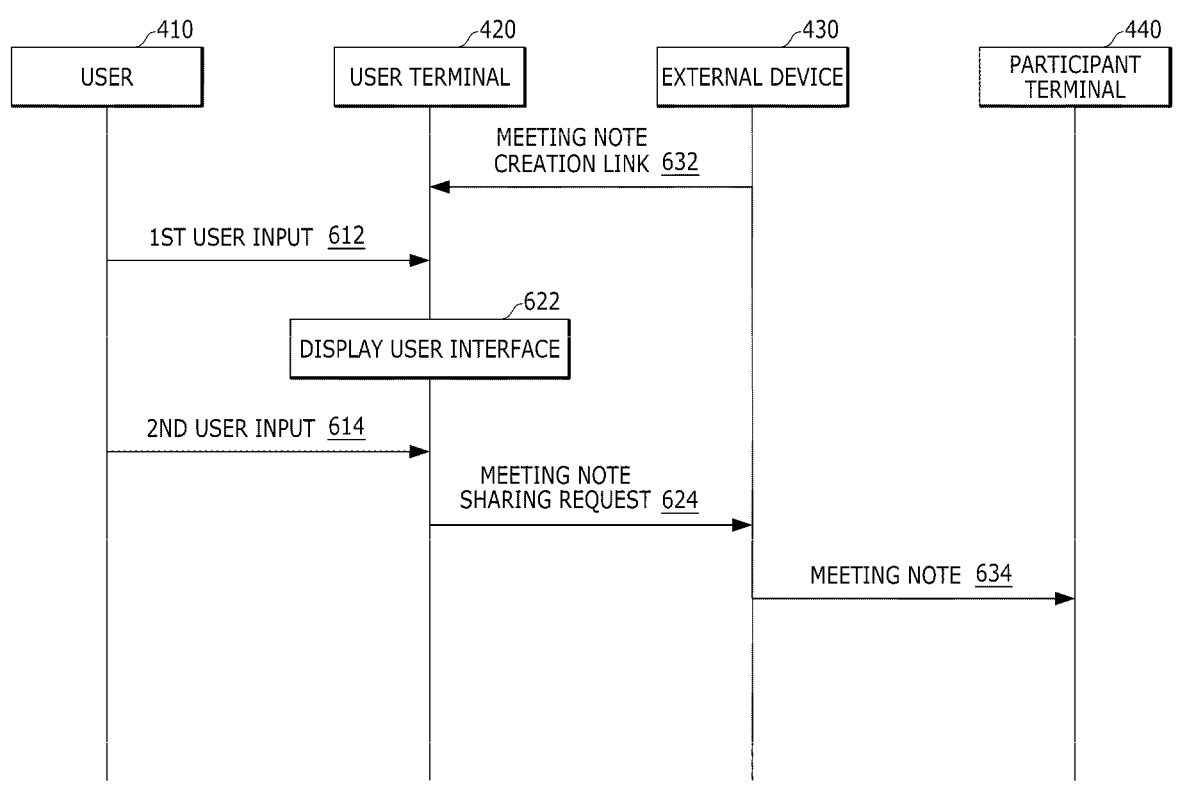
FIG. 6 is a flowchart illustrating a method for creating and sharing a meeting note between a user, a user terminal, an external device, and a participant terminal after an online meeting ends, according to an example embodiment.

FIG. 6 is a flowchart illustrating a method for creating and sharing a meeting note between the user 410, the user terminal 420, the external device 430, and the participant terminal 440 after an online meeting ends, according to an example embodiment. In an example embodiment, the user 410 may be a host who created the online meeting and the user terminal 420 may be a user terminal of the host. In another example embodiment, the user 410 and the user terminal 420 may be the user and the user terminal that received a host authorization from the host who created the online meeting. In yet another example embodiment, the user 410 and the user terminal 420 may be the user and the user terminal designated to write a meeting note by the host who created the online meeting or by a participant who received a host authorization from the host. In addition, the participant terminal 440 may be a user terminal of the participant participating in the online meeting.

As illustrated, when the online meeting ends, the external device 430 may transmit a meeting note creation link 632 to the user terminal 420. In an example embodiment, the meeting note creation link 632 may include link information (e.g., a URL) for connecting to a web page, a platform, and the like which can create a meeting note. Additionally, the meeting note creation link 632 may include information for identifying an online meeting associated with the meeting note. The meeting note creation link 632 may be transmitted to the user terminal 420 in the form of a message on a messenger linked to the external device, an SMS message, a push notification on an application, an e-mail, and the like.

Upon receiving from the user 410 a first user input 612 indicating selection of a link for creating a meeting note, the user terminal 420 may display on the display a user interface for creating a meeting note for the ended online meeting, at 622. In an example embodiment, the user interface for creating a meeting note may include a title of online meeting, an identifier of online meeting, a start time of online meeting, information about participants of online meeting, an editing area, and the like. In another example embodiment, the content and layout of the user interface for creating a meeting note may be determined based on the type of online meeting, and the like. For example, the user interface for creating a meeting note may include at least one of, according to the type of online meeting, an area for selecting at least one participant to share the meeting note with, a text editing area, an area for uploading a file or inputting a file link, an area for inputting a to-do list, an area for inputting at least one of information about a subsequent online meeting or a link to participate in a subsequent online meeting, an area for inputting information relating to at least one of payment or remittance, or an area for inputting a survey item.

Then, the user terminal 420 may receive from the user 410 at least one second user input 614 within the user interface indicating a command to create a meeting note. For example, the user 410 may modify the title of online meeting displayed on the user interface for creating a meeting note or add new content to the text editing area to create a meeting note. Then, the user 410 may select a meeting note sharing button through a touch input or the like in order to share the meeting note he or she has written so as to transmit a meeting note sharing request 624 to the external device 430. The meeting note sharing request 624 may include information associated with the second user input 614.

Upon receiving the meeting note sharing request 624, the external device 430 may transmit the created meeting note 634 to the participant terminal 440. While FIG. 6 illustrates that the external device 430 transmits the meeting note 634 to one participant terminal 440, example embodiments are not limited thereto. For example, there may be two or more participants in the online meeting, and the external device 430 may provide the meeting note 634 to terminals corresponding to all or some of the participants in the online meeting. As described above, the user 410 may provide the meeting note to the participants through the external device 430 storing information about the participants of the online meeting, thereby effectively sharing the meeting note even when the user does not know who the participants of the online meeting are or when it is difficult to have the contact information of the participants. In addition, even when the user 410 knows who the participants are, the user may still provide the meeting notes to the participants through the external device 430, thereby ensuring that the meeting note is shared without omitting any participant.

Figure 7:
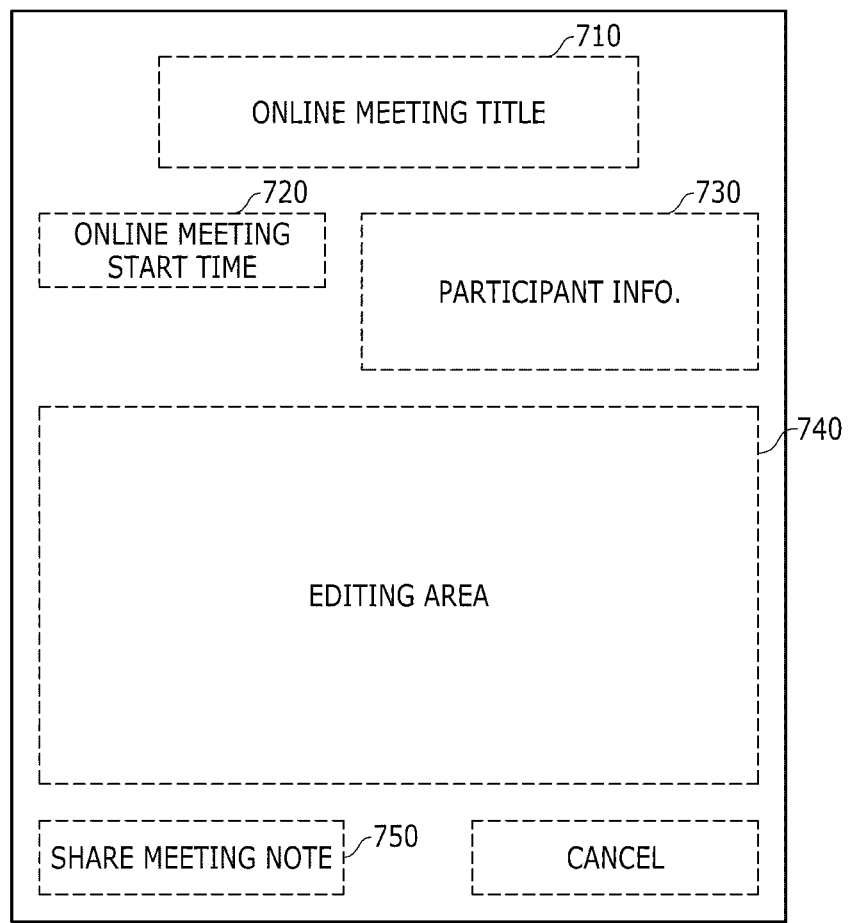
FIG. 7 is a diagram illustrating an example of a user interface for creating a meeting note according to an example embodiment.

FIG. 7 is a diagram illustrating an example of a user interface for creating a meeting note according to an example embodiment. In an example embodiment, when the online meeting ends, the user terminal may receive from an external device a link for creating a meeting note for the online meeting. Then, when the user selects the link for creating a meeting note displayed on the display of the user terminal, a user interface (e.g., a web document) for creating a meeting note may be displayed on the display.

As illustrated, the user interface for creating a meeting note may include an online meeting title display area 710, an online meeting start time display area 720, a participant information display area 730, a text editing area 740, a meeting note share button 750, and the like. The online meeting title displayed in the online meeting title display area 710 may be a title input by the host at the time of creating the online meeting. In an example embodiment, the online meeting title display area 710 may be configured to allow a user to edit the online meeting title. Additionally or alternatively, the user interface for creating a meeting note may include an area for displaying an identifier of an online meeting (e.g., a meeting ID assigned by a server that provides the online meeting service).

An online meeting start time may be displayed in the online meeting start time display area 720. The online meeting start time may be the time when the user transmits a request to start the online meeting to the external device to start the online meeting in the external device. In this case, the online meeting start time displayed in the online meeting start time display area 720 may be a time when the online meeting is started by the host user or one of the participants. Alternatively or additionally, the online meeting start time displayed in the online meeting start time display area 720 may be automatically calculated and recorded by an external device based on the time when the user participated in the online meeting, the time when at least a predetermined number of people participated in the online meeting, and the like. Additionally or alternatively, the area 720 may display an online meeting end time. Additionally or alternatively, in the online meeting start time display area 720, an online meeting duration (a period from the meeting start time to the meeting end time) may be displayed. In an example embodiment, the time displayed in the area 720 may be editable by the user.

The area 730 may display information about participants in the online meeting. In an example embodiment, the user may select a participant to share the meeting note with, among the participants displayed in the area 730. In this case, the meeting note is shared only with the participants selected by the user.

The area 740 may be an area where the user can input text. For example, in the area 740, the user may input content to be shared with the participants of the online meeting. Then, the user may select the meeting note sharing button 750 through a touch input or the like to share the meeting note with the participants.

While FIG. 7 illustrates that the user interface for creating a meeting note includes four areas 710, 720, 730, and 740, example embodiments are not limited thereto. For example, the user interface for creating a meeting note may further include an area for uploading a file or inputting a file link, an area for inputting a to-do list, information about a subsequent online meeting or a link to participate in a subsequent online meeting, an area for inputting information relating to at least one of payment or remittance, an area for inputting a survey item, and the like.

In an example embodiment, the type of area to be included in the user interface for creating a meeting note may be determined based on a meeting type of the online meeting (e.g., business meeting, social meeting, seminar, streaming event, and the like). In this case, a user interface for creating a meeting note, which is optimized for the meeting type, may be provided to the user, thereby providing an improved user experience. Examples of a user interface for creating a predetermined meeting note based on a meeting type will be described below with reference to FIGS. 9 to 11. Additionally or alternatively, the user interface for creating a meeting note may be configured to allow the user to edit the type of the area to be included in the user interface or the arrangement of the areas.

FIG. 8 is a diagram illustrating an example of the participant information display area 730 according to an example embodiment. As illustrated, the participant information display area 730 may display a nickname 810, an ID 820, an e-mail address 830, a participation period 840, or an activity score 850 of the participants, a checkbox menu 860 for selecting whether or not to share, and the like. The user terminal may receive all or part of the participant information from an external device. The user of the online meeting may identify the participants in the online meeting based on the participant information display area 730 displayed on the display, and select the participants to be provided with the meeting note.

The participant information display area 730 may display at least one of the nickname 810, the ID 820, and the e-mail address 830 of the participants as information for identifying the participant. For example, for a participant signed up for the online meeting service platform, the nickname 810 and the participant ID 820 may be displayed. In another example, for a participant who has not signed up for the online meeting service platform, the nickname 810 and the e-mail address 830 (or an SNS account) may be displayed. When the participant who has not signed up for the online meeting service platform participates in the online meeting using the online meeting participation link, an external device (e.g., a server for the online meeting service platform) may require the participant to input contact information such as e-mail address, SNS account, and the like.

The participation period 840 of the participant may be determined based on entry time and exit time of the participant with respect to the online meeting, and may indicate the duration, or period of time, that the participant attended the online meeting. In an example embodiment, the external device may record the entry time and exit time of the participant, and calculate the period between the entry time and the exit time as the participation period of the participant. Additionally or alternatively, entry times and exit times of the participants may be displayed in the participant information display area 730.

The activity score 850 may represent how active each of the participants were in in the online meeting. The activity score 850 for each of the participants may be calculated based on text chat frequency, voice speech frequency, and the like of each of the participants. Additionally or alternatively, the activity score 850 may be calculated based on a total number of participants, a total number of text chats in that online meeting, a number of text chats of a specific participant, a microphone activation time of all participants, a microphone activation time of a specific participant, a total online meeting duration, a participation period of a specific participant, and the like.

The checkbox menu 860 may be used by the user to select one or more participants to share a meeting note with. For example, when the user selects only the checkboxes that correspond to "James" and "Sally', the meeting note may be provided to only "James" and "Sally" among the participants. With such a configuration, the user can determine by himself/herself the participants to be provided with a meeting note, or effectively provide the meeting note only to participants with a high degree of participation in the online meeting.

While FIG. 8 illustrates that the user selects the participants to share the meeting note with, example embodiments are not limited thereto. In an example embodiment, the meeting note may be automatically provided to the participants having the participation period 840 that is equal to or greater than a predetermined threshold. For example, when the predetermined threshold is 40 minutes, the meeting note may be provided to "James" and "Sally" who have participated in the online meeting for 40 minutes or longer, and not provided to "Brown" and "Jessica" who have participated in the online meeting for less than 40 minutes. In another example embodiment, the meeting note may be automatically provided to the participants having the activity score that is equal to or greater than a predetermined threshold. For example, when the predetermined threshold is 50 points, the meeting note may be provided to "James" and "Sally"

whose activity score is higher than 50 points, and not provided to "Brown" and "Jessica" whose activity score is less than 50 points.

Figure 9:
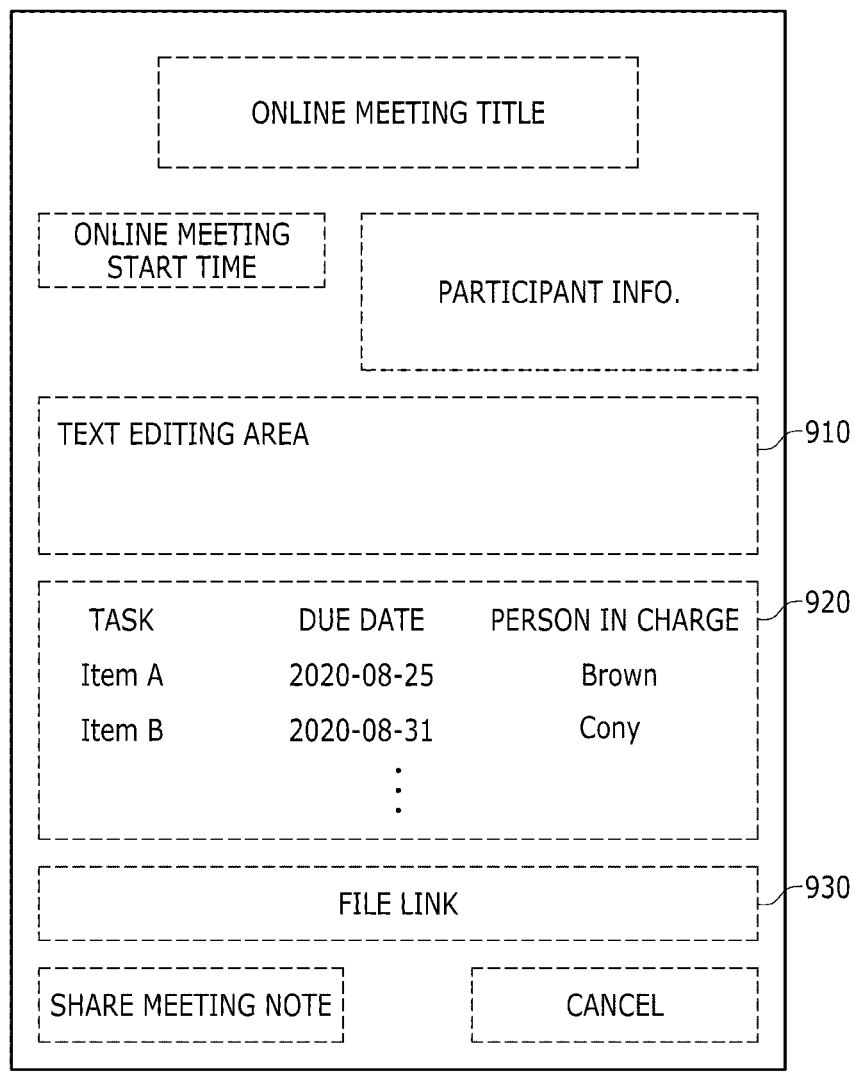
FIG. 9 is a diagram illustrating an example of a user interface for creating a meeting note for an online meeting according to an example embodiment.

FIG. 9 is a diagram illustrating an example of a user interface for creating a meeting note when the type of online meeting is business meeting according to an example embodiment. As illustrated, the user interface for creating a meeting note for a business meeting may include a text editing area 910, an area 920 for inputting a to-do list, an area 930 for inputting a file link, and the like. The user may freely input desired content to share with the participants in the text editing area 910. For example, the user may arrange and input the content discussed in the online meeting, information about a subsequent business meeting, and the like, in the text editing area 910.

The area 920 may be the area for recording tasks to be performed by the participants after the online meeting ends. In an example embodiment, the to-do list may include a task identifier for each item, a due date information for each item, information about a person in charge of each item, and the like. That is, the user may input in the area 920 tasks, due dates, and person in charge and share it with the online meeting participants.

The area 930 may be an area for inputting a file link for accessing the presentation materials, the conference materials, the reference materials, and the like used in the online meeting. Alternatively, the area 930 may be an area to upload files. For example, the area 930 to upload a file may be implemented as a drag-and-drop interface.

Figure 10:
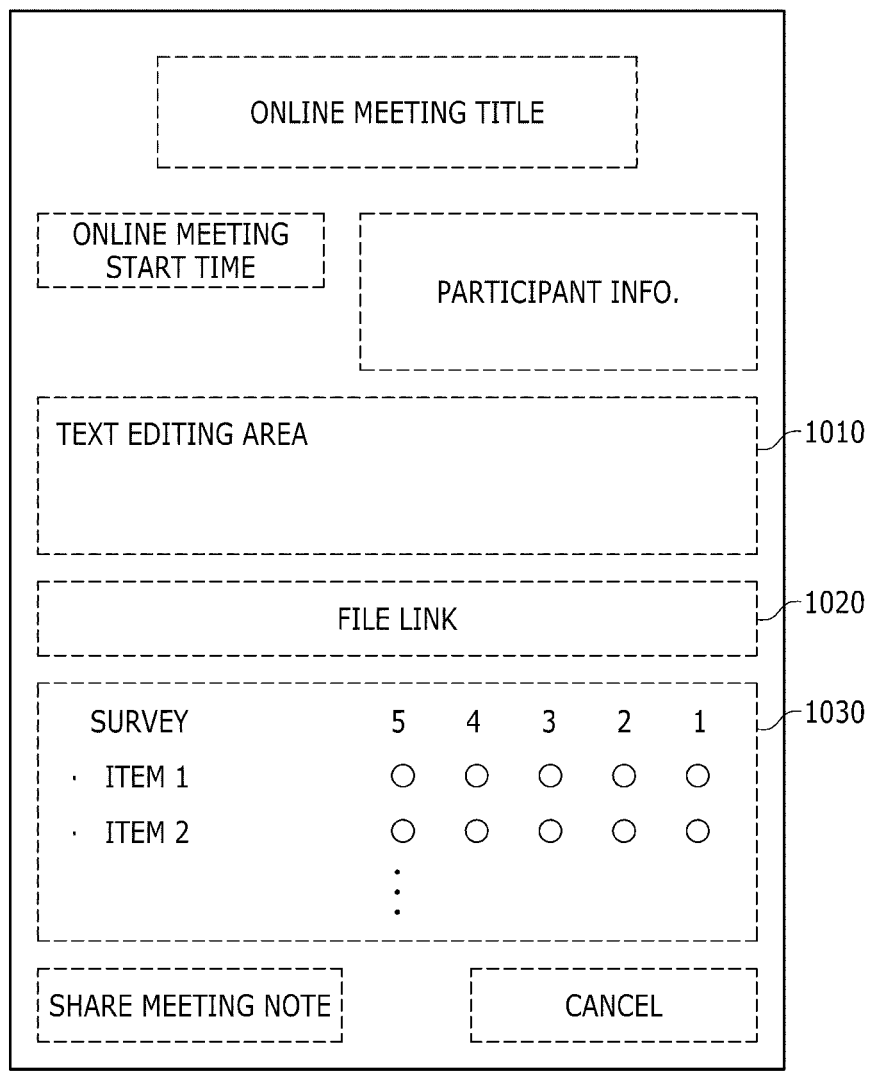
FIG. 10 is a diagram illustrating an example of a user interface for creating a meeting note for an online meeting according to an example embodiment.

FIG. 10 is a diagram illustrating an example of a user interface for creating a meeting note when the type of online meeting is a seminar according to an example embodiment. A seminar may refer to an activity, a program, and the like that provides information relating to a specific topic to multiple people, and in particular, a seminar conducted on the web may be referred to as a webinar, a compound word of the web and seminar. Such a seminar may be a type of online meeting that may be provided for an unspecified number of people as the participants, in which an unspecified number of people can participate.

As illustrated, the user interface for creating a meeting note for a seminar may include a text editing area 1010, an area 1020 for inputting a file link, an area 1030 for inputting a survey item, and the like. The user may freely input desired content to share with the participants in the text editing area 1010. For example, the user may input an introduction to the seminar, information about subsequent activities, and the like in the text editing area 1010. In addition, the user may input a file link for accessing the lecture materials, the promotional materials, and the like used in the seminar, in the area 1020 for inputting a file link. The area 1030 may be an area for inputting a survey item for evaluating the satisfaction with the seminar, and the like of the participants who took a part in the seminar. In an example embodiment, the area 1030 may include one or more survey items, a score area indicating satisfaction with the survey items, and the like. The user terminal may receive information indicating how the participants ranked the different survey items.

Figure 11:
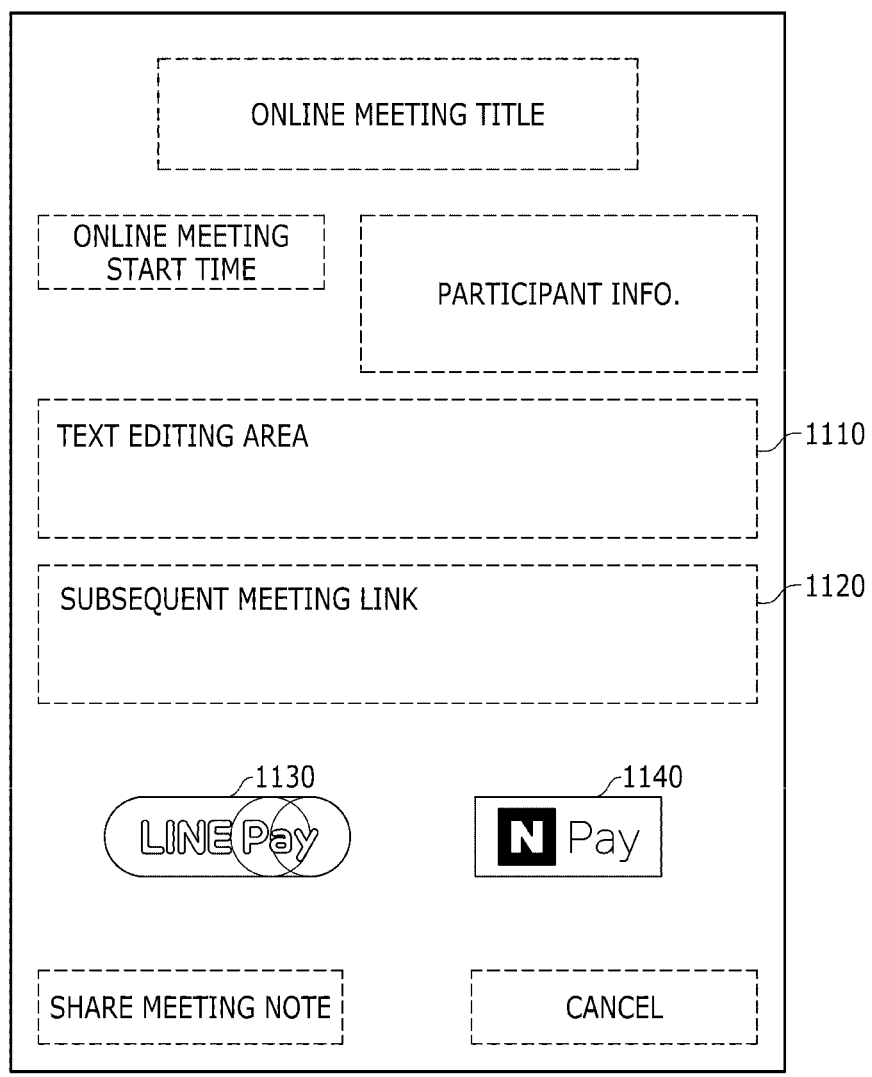
FIG. 11 is a diagram illustrating an example of a user interface for creating a meeting note for an online meeting according to an example embodiment.

FIG. 11 is a diagram illustrating an example of a user interface for creating a meeting note when the type of online meeting is a streaming event according to an example embodiment. A streaming event may refer to a type of online meeting in which the process of a specific event is provided to an unspecified or specified number of people in real-time video. For example, video of an event such as wedding or first birthday party can be shared and communicated with family and acquaintances through the online meeting.

As illustrated, the user interface for creating a meeting note for a streaming event may include a text editing area 1110, an area 1120 for inputting a subsequent meeting link, areas 1130 and 1140 for inputting information relating to at least one of payment or remittance, and the like. The user may freely input desired content to share with the participants in the text editing area 1110. For example, the user may input a thank-you note, information about a subsequent event, a method of giving congratulatory money, and the like in the text editing area 1010. In addition, when there is a subsequent event, the user may input a link to participate in the subsequent meeting in the area 1120.

The areas 1130 and 1140 for inputting information relating to at least one of payment or remittance may be used for payment or remittance of expenses such as membership fee, participation fee, congratulatory money, and the like. In an example embodiment, the areas 1130 and 1140 may be used to generate link information for enabling participants to easily perform remittance or payment using an open banking or simple payment service. For example, the user may use simple payment services such as "LINE PAY" or "N PAY" to receive payment or remittance from the participants. That is, the areas 1130 and 1140 may be the areas for inputting information about services associated with other external devices (e.g., a server for online simple payment service, a server for online remittance service, and the like) different from the external device (e.g., the server for online meeting service).

FIG. 12 is a flowchart illustrating a method 1200 for sharing a meeting note according to an example embodiment. According to an example embodiment, the method 1200 for sharing a meeting note may be performed by the user terminal (e.g., under control of one or more processors of the user terminal). As illustrated, the method 1200 for sharing a meeting note may be started by the processor receiving a link for creating a meeting note for the online meeting in response to the end of the online meeting from an external device, at S1210.

The processor may control the user terminal to display the user interface for creating a meeting note for the online meeting of the user terminal in response to the first user input for selecting a link for creating a meeting note, at S1220. For example, the user interface for creating a meeting note may include at least one of an area for selecting at least one participant to share the meeting note with, a text editing area, an area for uploading a file or inputting a file link, an area for inputting a to-do list, an area for inputting at least one of information about a subsequent online meeting or a link to participate in a subsequent online meeting, an area for inputting information relating to at least one of payment or remittance, or an area for inputting a survey item. In an example embodiment, the user interface for creating a meeting note may be determined based on the meeting type of the online meeting.

The user terminal may receive at least one second user input within the user interface for creating a meeting note, at S1230. The second user input may include a user input to select a participant to share a meeting note with, a user input to input content to be shared with the participant, a user input to upload a file or input a file link, a user input to input a to-do list, a user input to input information about a subsequent online meeting or a link to participate in the subsequent online meeting, a user input to input information relating to at least one of payment or remittance, a user input to input a survey item, and the like.

The user terminal may transmit information associated with the at least one second user input to the external device in order to share the meeting note created based on the at least one second user input with the at least one of the participant of the online meeting, at S1240. The external device receiving the meeting note from the processor may share the meeting note with the participants based on the stored information about the participants.

The method for sharing a meeting note described above may be implemented by a computer program stored in a computer-readable recording medium for execution on a computer. The medium may be non-transitory. The medium may continuously store a program executable by a computer or temporarily store a program for execution or download. In addition, the medium may be a variety of recording means or storage means in a form in which a single piece of hardware or several pieces of hardware are combined, but is not limited to a medium directly connected to any computer system, and may be present on a network in a distributed manner. An example of the medium includes a medium that is configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic circuits designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in the present disclosure may be implemented in multiple processing chips or devices, and storage may be similarly influenced across a plurality of devices. Such devices may include PCs, network servers, and portable devices.

Although example embodiments have been described, various modifications and changes can be made without departing from the scope of the present disclosure. Further, such modifications and changes are intended to fall within the scope of the claims appended herein.

The invention claimed is:

1. A method comprising:
based on a request to create an online meeting, receiving, from an external device, a link for participating in the online meeting, wherein the request to create the online meeting includes information about a meeting type;
based on an ending of the online meeting associated with the link for participating in the online meeting, receiving, by a user terminal, a link for creating a meeting note for the online meeting from the external device;
based on a first user input of selecting the link for creating the meeting note, displaying a user interface for creating the meeting note on a display of the user terminal, wherein the user interface for creating the meeting note is determined based on the meeting type of the online meeting;
receiving at least one second user input within the user interface for creating the meeting note; and
transmitting information associated with the at least one second user input to the external device to control the external device to share the meeting note created based on the at least one second user input with at least one participant of the online meeting.

2. The method according to claim 1, wherein displaying the user interface for creating the meeting note comprises providing, to a user, the user interface for creating the meeting note that is optimized for the meeting type of the online meeting.

3. The method according to claim 1, wherein the user interface for creating the meeting note is determined based on whether a presentation material was used in the online meeting.

4. The method according to claim 1, wherein the user interface for creating the meeting note comprises an area in which any one or any combination of a title of the online meeting or an identifier of the online meeting is displayed.

5. The method according to claim 1, wherein the user interface for creating the meeting note comprises an area in which information about participants of the online meeting is displayed.

6. The method according to claim 5, wherein the information about the participants of the online meeting indicates any one or any combination of a nickname, an identifier, or an e-mail address.

7. The method according to claim 5, wherein the information about the participants of the online meeting indicates any one or any combination of a participation period, an entry time, an exit time, or an activity score for each of the participants.

8. The method according to claim 5, wherein the user interface for creating the meeting note comprises an area for selecting at least one of the participants of the online meeting to share the meeting note with.

9. The method according to claim 1, wherein the user interface for creating the meeting note comprises, based on the meeting type of the online meeting, an area for inputting a to-do list associated with at least one of participants of the online meeting.

10. The method according to claim 1, wherein the user interface for creating the meeting note comprises, based on the meeting type of the online meeting, an area for inputting a survey item for each participant of the online meeting.

11. The method according to claim 1, wherein, based on the meeting type of the online meeting, the user interface for creating the meeting note is used to generate link information associated with remittance or payment.

12. The method according to claim 1, wherein the user interface for creating the meeting note comprises an area for inputting any one or any combination of information about a subsequent online meeting or a subsequent online meeting link for participating in the subsequent online meeting.

13. The method according to claim 1, wherein the user interface for creating the meeting note comprises an area for inputting information about a service associated with another external device different from the external device.

14. The method according to claim 1, wherein the user terminal is associated with a participant of the online meeting that is designated by a user who created the online meeting.

15. The method according to claim 1, further comprising sharing the meeting note with at least one participant of the online meeting that has a participation period or activity score equal to or greater than a predetermined threshold.

16. A non-transitory computer-readable recording medium storing instructions for executing a method comprising:
based on a request to create an online meeting, receiving, from an external device, a link for participating in the online meeting, wherein the request to create the online meeting includes information about a meeting type;
based on an ending of the online meeting associated with the link for participating in the online meeting, receiving, by a user terminal, a link for creating a meeting note for the online meeting from the external device;
based on a first user input of selecting the link for creating the meeting note, displaying a user interface for creating the meeting note on a display of the user terminal, wherein the user interface for creating the meeting note is determined based on the meeting type of the online meeting;
receiving at least one second user input within the user interface for creating the meeting note; and
transmitting information associated with the at least one second user input to the external device to control the external device to share the meeting note created based on the at least one second user input with at least one participant of the online meeting.

17. An information processing system comprising:
a communication interface;
a memory; and
at least one processor configured to execute at least one computer-readable program stored in the memory, wherein the at least one computer-readable program comprises instructions for controlling the information processing system to:
based on a request to create an online meeting from a first user terminal, transmit a link for participating in the online meeting, wherein the request to create the online meeting includes information about a meeting type;
based on an ending of the online meeting associated with the link for participating in the online meeting, transmit a link for creating a meeting note for the online meeting to the first user terminal, wherein the link for creating a meeting note includes is associated with providing a user interface for creating the meeting note determined based on the meeting type of the online meeting;
receive a request to share the meeting note from the first user terminal, wherein the request to share the meeting note comprises information about the meeting note; and
transmit the meeting note to a plurality of second user terminals associated with participants of the online meeting based on the request to share the meeting note.

18. The information processing system according to claim 17, wherein providing a user interface for creating the meeting note comprises providing a user interface for creating the meeting note that is optimized for a meeting type of the online meeting.

19. The information processing system according to claim 17, wherein providing a user interface for creating the meeting note comprises providing a user interface for creating the meeting note based on a determination whether a presentation material was used in the online meeting.

20. The information processing system according to claim 17, wherein the plurality of second user terminals are respectively associated with the participants of the online meeting having a participation period or activity score equal to or greater than a predetermined threshold.

* * * * *